United States Patent
Venkatesh et al.

(10) Patent No.: US 10,339,008 B2
(45) Date of Patent: Jul. 2, 2019

(54) DETERMINING TYPE OF BACKUP

(71) Applicant: Hewlett Packard Enterprise Development LP, Houston, TX (US)

(72) Inventors: Lokesh Murthy Venkatesh, Bangalore (IN); Nandan Shantharaj, Bangalore (IN); Sunil Turakani, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 36 days.

(21) Appl. No.: 15/257,956

(22) Filed: Sep. 7, 2016

(65) Prior Publication Data

US 2018/0067813 A1 Mar. 8, 2018

(51) Int. Cl.
*G06F 11/00* (2006.01)
*G06F 11/14* (2006.01)

(52) U.S. Cl.
CPC .......... *G06F 11/1451* (2013.01); *G06F 11/14* (2013.01); *G06F 11/1469* (2013.01); *G06F 2201/805* (2013.01)

(58) Field of Classification Search
CPC ............. G06F 11/1446; G06F 11/1451; G06F 11/1458; G06F 11/1461
See application file for complete search history.

(56) References Cited

U.S. PATENT DOCUMENTS

| | | | | |
|---|---|---|---|---|
| 7,330,997 B1* | 2/2008 | Odom | ................. | G06F 11/1464 711/162 |
| 8,959,058 B1* | 2/2015 | Kleinschnitz | ....... | G06F 11/1461 707/644 |
| 9,519,432 B1* | 12/2016 | Haustein | ................. | G06F 11/00 |
| 9,684,562 B2* | 6/2017 | Bell | .................... | G06F 11/1438 |
| 2011/0107043 A1* | 5/2011 | Palagummi | ......... | G06F 11/1458 711/162 |
| 2012/0089572 A1* | 4/2012 | Raichstein | .......... | G06F 11/1461 707/645 |
| 2015/0370645 A1 | 12/2015 | Dhanalakoti et al. | | |
| 2017/0010941 A1* | 1/2017 | Shimada | ............. | G06F 11/1464 |
| 2017/0011049 A1 | 1/2017 | Venkatesh et al. | | |

* cited by examiner

*Primary Examiner* — Michael Maskulinski
(74) *Attorney, Agent, or Firm* — Hewlett Packard Enterprise Patent Department (57) ABSTRACT

In some examples, a computing device may include a physical processor that executes machine readable instructions that cause the computing device to obtain, from the system, an actual value of a backup parameter for each backup parameter of a set of backup parameters. Each backup parameter may have a predefined threshold for the backup parameter. Execution of the machine readable instructions may further cause the computing device to determine a weightage for the backup parameter based on the predefined threshold and the actual value. The weightage may indicate a degree of contribution of the backup parameter for determining the type of backup to be executed in the system, and execution of the machine readable instructions may cause the computing device to determine the type of backup based on the weightage and the actual value of each backup parameter of the set of backup parameters.

18 Claims, 8 Drawing Sheets

---

210 INSTRUCTIONS TO DETERMINE A WEIGHTAGE CHANGE VALUE FOR EACH BACKUP PARAMETER

220 INSTRUCTIONS TO DETERMINE THE WEIGHTAGE FOR EACH BACKUP PARAMETER BASED ON THE WEIGHTAGE CHANGE VALUE

230 INSTRUCTIONS TO DETERMINE A BACKUP TYPE VALUE FOR THE SET OF BACKUP PARAMETERS

240 INSTRUCTIONS TO DETERMINE THE TYPE OF BACKUP BY APPLYNG FUZZY LOGIC AGAINST THE BACKUP TYPE VALUE

DETERMINING TYPE OF BACKUP

BACKGROUND

In information technology, a backup, or the process of backing up, can refer to the copying and archiving of computer data so it may be used to restore to a previous state after a data loss event. Backups may have two distinct purposes: The primary purpose can be to recover data after its loss, be it by data deletion or corruption. The secondary purpose of backups can be to recover data from an earlier time, according to a user-defined data retention policy, typically configured within a backup application for how long copies of data may be required.

BRIEF DESCRIPTION OF THE DRAWINGS

The following detailed description references the drawings, wherein.

DETAILED DESCRIPTION

In an enterprise environment containing physical and virtual infrastructure hosting various applications, a duty of a systems administrator can be considering a disaster strategy. The strategy should include backup of databases/applications with efficient device utilization in terms of used storage space in order to have a better Recovery Point Objective (RPO), a better Recovery Time objective (RTO), and/or a reduced backup window.

A systems administrator may choose a backup product or strategy to satisfy the above considerations. With the backup product in place, the administrator may be required to manually start the backup or schedule the backup at an appropriate time. The backup process may include the selection of the source application/database to backup, target devices to store the backup image(s), and the type of backup to be executed. Example backup types include incremental backups, differential backups, full backups, or a determination to perform no backup.

In a full backup, all the blocks of the source application can be considered for the backup. As examples, a full backup may be performed for an initial system backup or if the time elapsed from the last full backup is long due (e.g., exceeds a time threshold), which may result in a better RTO. In a differential backup, the blocks modified from the last full backup may be considered for backup while non-modified blocks from the last full backup are not considered. In an incremental backup, the blocks modified from last full or the last differential backup or last incremental backup may be considered for backup while non-modified blocks from the last full backup or the last differential backup or last incremental backup are not considered. Based on the type of backup selected for a system, trade-offs may exist between a better device utilization and a reduced backup window with a faster recovery time. In this respect, the selection of the backup type by the systems administrator may be an important factor in order to implement an efficient backup plan. Automatic selection or determination of the type of backup for a system may also increase system efficiency.

Examples consistent with the present disclosure can provide a mechanism to automatically determine the type of backup based on backup parameters associated with the system to be backed up. Backup parameters considered in the determination may be any parameter that affects the effectiveness, efficiency, or feasibility of the system backup. Example backup parameters may thus include an amount of (data) changes in a system, future backup schedules, historic job execution data, or availability of resources (e.g., available storage space).

Through automatic backup type selection based on backup parameters, the features described herein may result in a reduced backup window, increased or optimized resource utilization, and support for a system administrator to automatically determine the type of backup. Furthermore, a better RTO can be achieved by preserving a trade-off between the RTO and the type of the backup performed. Hence, an appropriate selection of the backup type can reduce the administrator efforts greatly, while achieving better device utilization, backup windows with increased effectiveness, and reduced recovery time.

Figure 1:
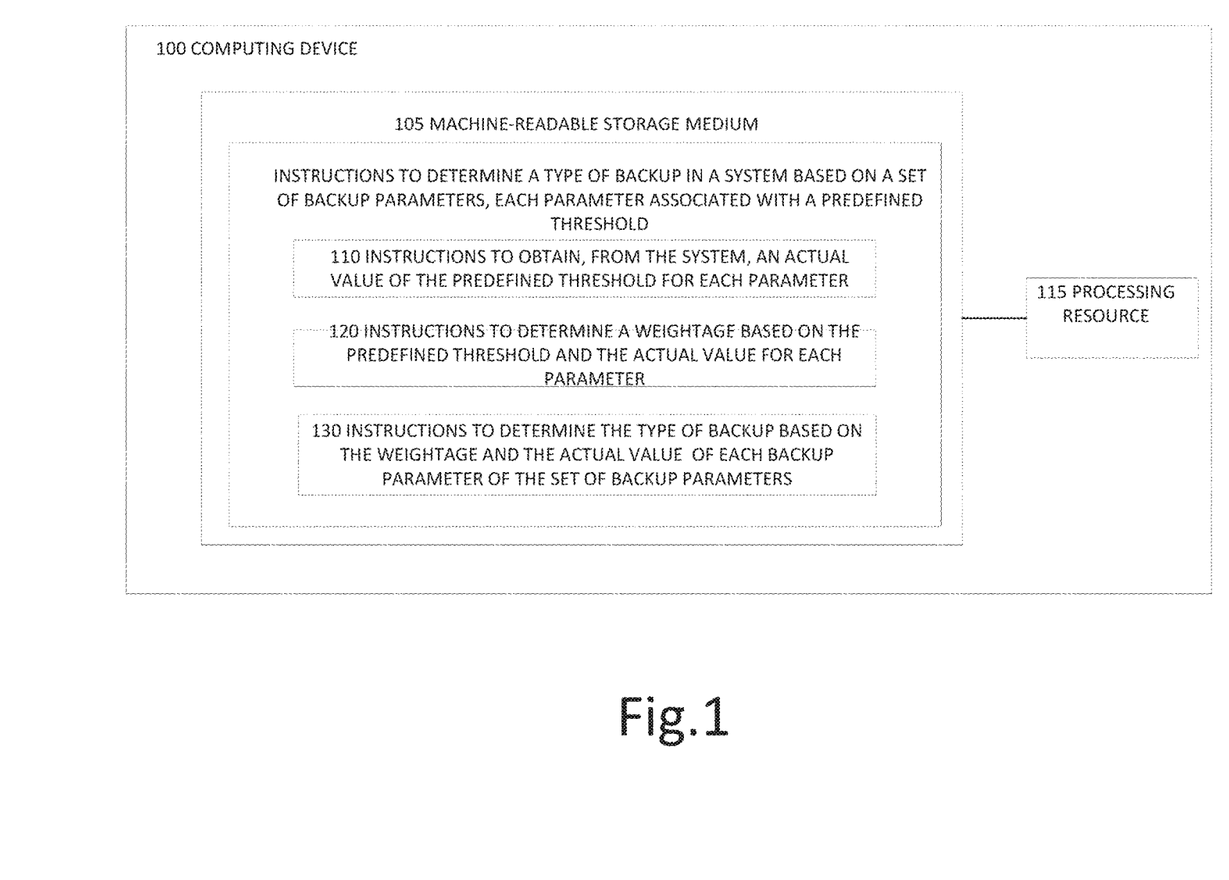
FIG. 1 is a block diagram of an example computing device for determining a type of backup in a system.

Referring now to the drawings, FIG. 1 shows an example of a computing device 100 for determining a type of backup in a system. The computing device 100 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network that perform the functions described herein. In the example shown in FIG. 1, system 100 includes a processing resource 115 and a non-transitory machine-readable storage medium 105 encoded with instructions to determine a type of backup for a system.

The processing resource 115 may be one or more central processing units (CPUs), semiconductor-based microprocessors, and/or other hardware devices suitable for retrieval and execution of instructions stored in a machine-readable storage medium 105. The processing resource 115 may fetch, decode, and execute instructions 110, 120 and 130 and/or other instructions to implement the procedures described herein. As an alternative or in addition to retrieving and executing instructions, the processing resource 115 may include one or more electronic circuits that include electronic components for performing the functionality of one or more of instructions 110, 120 and 130.

In an example, the program instructions 110, 120 and 130 and/or other instructions can be part of an installation package that can be executed by the processing resource 115 to implement any of the functionality described herein. In such a case, the machine-readable storage medium 105 may be a portable medium such as a CD, DVD, or flash drive or a memory maintained by a computing device from which the installation package can be downloaded and installed. In another example, the program instructions may be part of an application or applications already installed on the computing device 100.

The machine-readable storage medium 105 may be any electronic, magnetic, optical, or other physical storage device that contains or stores executable data accessible to the computing device 100. Thus, the machine-readable storage medium 105 may be, for example, a Random Access Memory (RAM), an Electrically Erasable Programmable Read-Only Memory (EEPROM), a storage device, an optical disc, and the like. The machine-readable storage medium 105 may be a non-transitory storage medium, where the term "non-transitory" does not encompass transitory propagating signals. The machine-readable storage medium 105 may be located in the computing device 100 and/or in another device in communication with the computing device 100.

As described in detail below, the machine-readable storage medium 105 may be encoded with instructions to determine a type of backup in a system based on a set of backup parameters, where each parameter can have a predefined threshold for the backup parameter. The predefined threshold can be a value of the backup parameter that may be defined by a user of the system for the backup. As examples, the predefined threshold may be a percentage value (a threshold % of data size change in the system since a previous backup) or a discrete value (e.g., a threshold number of days until a next backup), and the like.

In particular, the machine-readable storage medium 105 can comprise instructions 110 to obtain, from the system, an actual value of the backup parameter for each parameter from the set of backup parameters. In some examples, the predefined threshold for a backup parameter can specified or measured as a value in a threshold scale, e.g. between 0 and 100. Some examples of backup parameters can be e.g. a percentage of data change in the system from a last backup, a frequency of scheduled backups in the system, a percentage of available storage space in the system, a time that has passed since a last backup, a type of data to be backed up in the system, available resources in the system (load on Control Processing Unit (CPU), free memory available, network bandwidth), a number of times a backup was executed in the system during a specified time period, etc. The threshold scale for a backup parameter may be a mapping of backup parameter values in a predetermined range (e.g., 0-100% or 100 megabytes-100 gigabytes of data change), and the predefined threshold may be a value represented in the threshold scale (e.g., 60% or 2.5 gigabytes of data change). In some examples, the threshold scale represents a normalized scale of backup parameter values.

The machine-readable storage medium 105 can comprise instructions 120 to determine a weightage for a backup parameter based on the predefined threshold for the backup parameter and the actual value of the backup parameter, and do so for each parameter from the set of backup parameters. The weightage for a backup parameter can indicate a degree of contribution of a particular backup parameter for determining the type of backup to be executed in the system. In some examples, the greater the weightage for a particular backup parameter, the greater the degree of contribution by the particular backup parameter in determining the type of backup, and vice versa. The weightage can be, e.g., a numeric integer value with default range between [1, 10] (or any other configurable numerical range). As the weightage may be configured or measured as a numerical range, there may be a minimum weightage value and a maximum weightage value in the range from which the weightage can be calculated or determined.

In some examples, the numerical range of weightage values can be mapped to a normalized range of values of the backup parameter. This normalized range of values for the backup parameter may be referred to as a threshold scale, e.g., as noted above. The threshold scale may range from [0,100], for instance, where the threshold scale comprises a maximum threshold value of 100. In some examples, the minimum weightage value can be a value of 1 and can be associated with (e.g., mapped to) an interval within the threshold scale (e.g., a subrange of a range of the actual or normalized values of the backup parameter) between [0, predefined threshold]. In some examples, the maximum weightage value can be a value of 10 (or any other configurable maximum value) and can be associated with (e.g., mapped to) the maximum threshold value of 100 (or any other normalized scale). The rest of the threshold scale may map weightage values within the range [predefined threshold, 100], which can be equally divided between the remaining values of weightage [2, 9]. Hence, the weightage for a backup parameter can be determined based on the predefined threshold for the backup parameter and the actual value of the backup parameter as, for example:

$$\text{Weightage} = \frac{\text{Actual value} - \text{Predefined threshold}}{\left(\frac{\text{Maximum threshold value} - \text{Predefined threshold}}{\text{Maximum weightage} - \text{Minimum weightage}}\right)} + 1$$

The machine-readable storage medium 105 can comprise instructions 130 to determine the type of backup based on the weightage and the actual value obtained for each backup parameter from the set of backup parameters according to above-mentioned equation. As such, automatic determination of different type of backups can be determined. In particular, the type of backup can be full backup, differential backup, incremental backup, or a determination to perform no backup. The type of backup determined as full backup can be a backup wherein all the blocks of the source application can be considered for backup. The full backup can be done for the first time the system is backed up, or if the elapsed time from the last full backup is long due in order to have a better RTO. The type of backup determined as differential backup can be a backup of the blocks modified from the last full backup while non-modified blocks from the last full backup are not considered. The type of backup determined as incremental backup can be a backup of the blocks modified from the last full backup or the last differential backup or last incremental backup while non-modified blocks from the last full backup or the last differential backup or last incremental backup are not considered.

Figure 2:
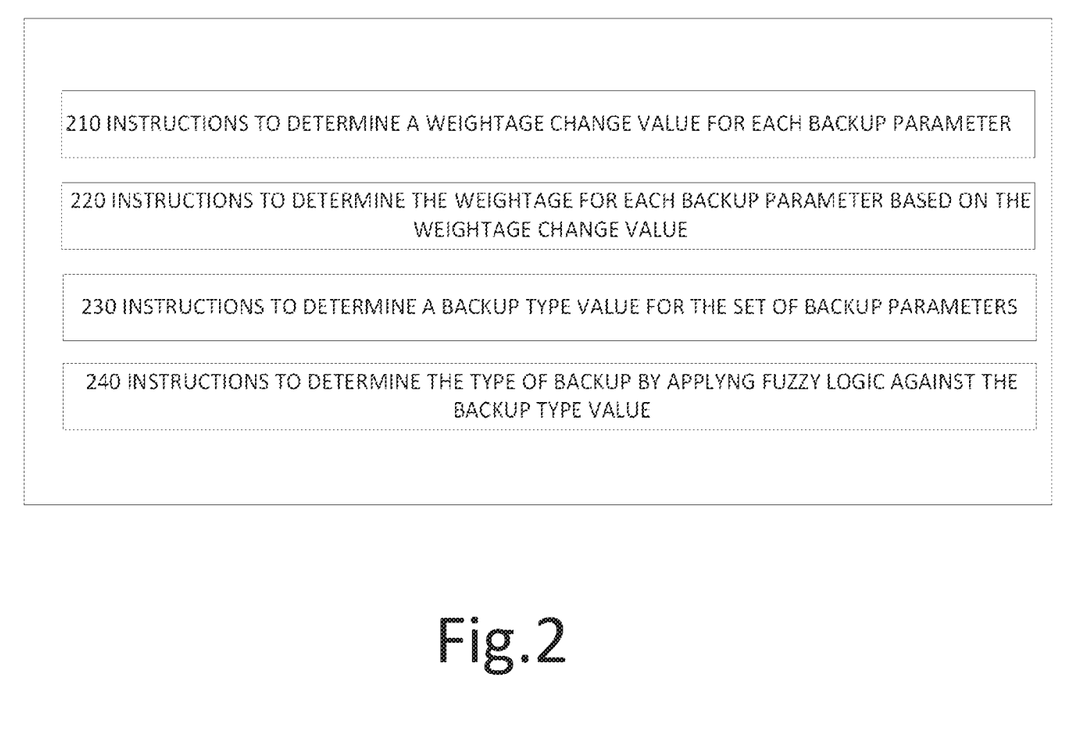
FIG. 2 is a block diagram of example instructions that can be used to determine the type of backup in the system.

Turning to FIG. 2, FIG. 2 is a block diagram of example instructions that can be used to determine the type of backup in the system. The machine-readable storage medium 105 of FIG. 1, for example, can comprise (e.g., store) instructions shown in FIG. 2. In particular, the machine-readable storage medium 105 can comprise instructions 210 to determine for a weightage change value for each backup parameter. The weightage change value can be a value associated with a variation of the weightage with relation to an increase of the predefined threshold for each of the backup parameters. The increase of the weightage can be of, e.g., one unit. Some of the aforementioned terms: maximum threshold value, predefined threshold, maximum and minimum weightage can be used to determine the weightage change value. In an example according to the present disclosure, the weightage change value can be determined as:

Weightage change value =

$$\frac{\text{Maximum threshold value} - \text{Predefined threshold}}{\text{Maximum weightage} - \text{Minimum weightage}}$$

The machine-readable storage medium 105 can comprise instructions 220 to determine the weightage for each backup parameter based on the weightage change value. Hence, the weightage can be, as one example:

$$\text{Weightage} = \frac{\text{Actual value} - \text{Predefined threshold}}{\text{Weightage change value}} + 1$$

The machine-readable storage medium 105 can comprise instructions 230 to determine a backup type value for the set of backup parameters. The backup type value can be defined as an average of the weighted values associated with the set of backup parameters.

The total number of backup parameters may be determined from the set of backup parameters, e.g. as a number 'n' from the backup parameters (1=1 . . . n). Accordingly, the weightage can be summed up and averaged by dividing by the total weightage for the backup parameters in order to obtain the backup type value. The total weightage can be calculated as a sum of the maximum weightage for the 'n' backup parameters. Hence, the following equation shows an example of how the backup type value can be calculated for a set of 'n' backup parameters.

$$\text{Backup type value} = \sum_{i=1}^{n} \frac{\text{Actual value} * \text{Weightage}}{\text{Total weightage}}$$

As previously mentioned in the present disclosure, the maximum weightage value can be 10 in some examples. Hence, the total weightage having four backup parameters, e.g. in this example where 'n'=4, can be 40. In other examples, multiplying the actual value by the weightage can be defined as the weighted value of the backup parameter.

The machine-readable storage medium 105 can comprise instructions 240 to determine the type of backup by applying fuzzy logic against the backup type value. Fuzzy logic may refer to a form of many-valued logic in which the equivalent values of variables may be any real number between 0 and 1, considered to be "fuzzy". According to some examples, the fuzzy logic that can be applied to the backup type value determined according to the above-mentioned equation can be defined within the range [0, 1]. Thus, application of fuzzy logic against the backup type value may apply a calculated value between [0, 1] to fuzzy logic, and the calculated value may be the backup type value. The calculated backup type value may be used to determine the type of backup to be executed for a system. Table 1 below shows an example of the relationship between the backup type value applied to fuzzy logic as well as the type of backup that can be executed in the system according to the fuzzy logic.

TABLE 1

| Backup type value range for fuzzy logic | Type of backup to be executed in the system |
|---|---|
| [0-0.15] | Determination to perform no backup |
| (0.15, 0.25) | Incremental |
| (0.25, 0.50) | Differential |
| >=0.50 | Full |

Figure 3:
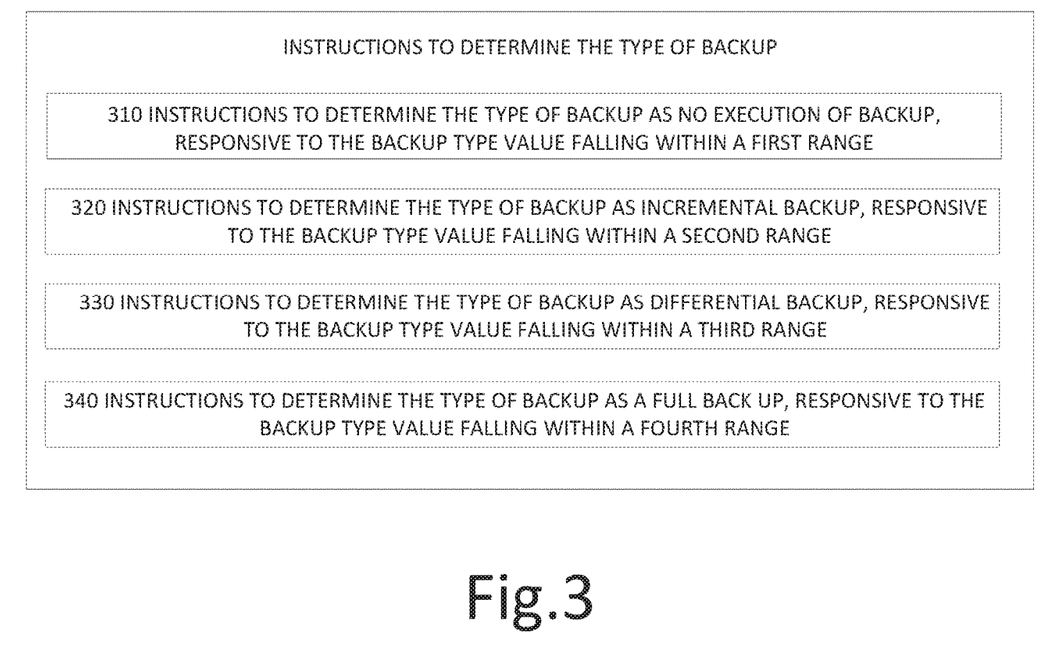
FIG. 3 is a block diagram of example instructions that can be used to determine the type of backup in the system.

Referring now to FIG. 3, FIG. 3 is a block diagram of example instructions that can be used to determine the type of backup in the system. The machine-readable storage medium 105, for example, can comprise instructions shown in FIG. 3. In particular, the machine-readable storage medium 105 can comprise instructions 310 to determine the type of backup as "a determination to perform no backup", responsive to the backup type value falling within a first range. According to the example of Table 1, the first range of backup type values can fall within [0-0.15].

The machine-readable storage medium 105 can comprise instructions 320 to determine the type of backup as "incremental backup", responsive to the backup type value falling within a second range. According to the example of Table 1, the second range of backup type values can fall within (0.15, 0.25).

The machine-readable storage medium 105 can comprise instructions 330 to determine the type of backup as "differential backup", responsive to the backup type value falling within a third range. According to the example of Table 1, the third range of backup type values can fall within (0.25, 0.50).

The machine-readable storage medium 105 can comprise instructions 340 to determine the type of backup as "full backup", responsive to the backup type value falling within a fourth range. According to the example of Table 1, the fourth range of backup type values can fall within [0.50, 1]. While one specific example of four different ranges is discussed through Table 1, any other number or combination of configurable fuzzy value or backup type value ranges may be used to determine, select, or otherwise differentiate backup types for a system.

Figure 4:
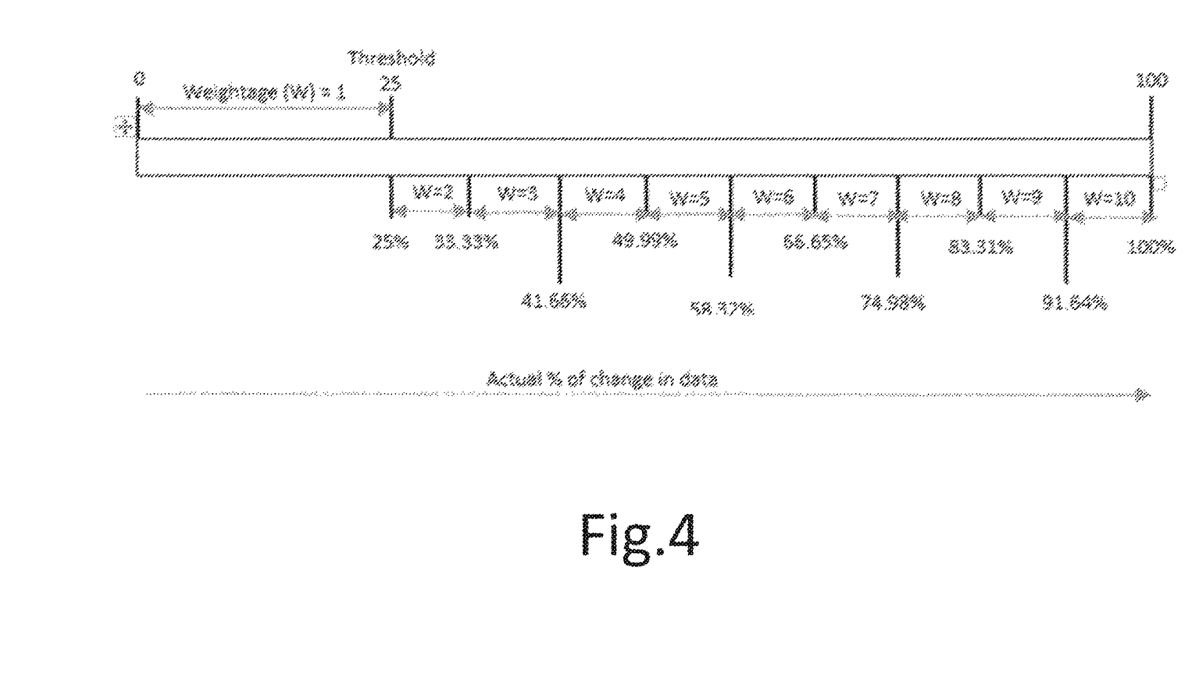
FIG. 4 is an example relationship between ranges of weightages for a backup parameter.

Turning to FIG. 4, FIG. 4 shows an example scheme according to the present disclosure of a relationship between ranges of weightage values associated with a backup parameter. The backup parameter in particular for the example of FIG. 4 is "amount of data changes in the system". These changes can be related to, e.g., system software and types of data accessed by the system. For this particular example, the predefined threshold value for "amount of data changes in the system" is 25%, i.e. a predefined threshold value of 25 within a threshold scale from 0 to 100 as shown in FIG. 4. The actual value of the backup parameter can be determined according to the instructions 110 of FIG. 1 for instance. In this respect, the actual value of the "amount of data changes in the system" backup parameter in the system can be obtained from the system by e.g. accessing an application for system backup management. The actual value of the backup parameter for the aforementioned backup parameter can be, for this illustration, 40%, i.e., 40 within the threshold scale. In order to determine the weightage change value for this backup parameter by implementing instructions 210, the maximum threshold value of the threshold scale (100), the maximum weightage (10), and the minimum weightage (1) can be used. Hence the weightage change value (%)=(100−25)/(10−1)=75/9=8.33%.

The weightage change value can be indicated as it is shown in FIG. 4, so show that the increase of 8.33% in the threshold scale of the "amount of data changes in the system" backup parameter can imply the increase of weightage in one unit. Put another way, a change of 8.33% in the threshold scale for the "amount of data change in the system" backup parameter can indicate a change in weightage value of one unit for weightage values [2, 10]. In FIG. 4, the minimum weightage equal to 1 can be associated with the predefined threshold of 25%. For an increase in 8.33% of the "amount of data change in the system" backup parameter with a value in the threshold scale of 33.3%, the weightage can be 2 (e.g., 25-33.3%). For a further increase in 8.33% of the backup parameter in the threshold scale (i.e., to 41.66%), the weightage can be 3, and so on. Hence, FIG. 4 shows the ranges of weightage associated with the different values of the "actual change in data" backup parameter within the threshold scale for a weightage change value of 8.33%.

Hence, by implementing instructions 220, the weightage can be defined based on the weightage change value as:

Weightage=[(40−25)/8.33+1]=[2.8]=3

In this example, the "actual change in data" backup parameter can have a weightage of 3 when the actual value of the "amount of data change in the system" backup parameter is 40%. For each of the backup parameters applied by a system for backup type determination, its actual value can be multiplied by the weightage as shown in the equation for determining the backup type value, thus used to calculate the weighted value of each backup parameter.

Table 2 shows another example according to the present disclosure where four different backup parameters can be used to determine the type of backup in a system. The four backup parameters used in the present example to determine the type of backup are: "amount of data changes in the system", "scheduled frequency of backup", "time from last backup" and "available storage space". Table 2 shows the predefined threshold for each of the backup parameters, an example actual value of the backup parameter obtained from the system (e.g. a virtual machine), the calculated weightage change value, the calculated weightage, the calculated weighted value (as the actual value multiplied by the weightage), and the backup type value for the four backup parameters. Table 2 shows four backup parameters. Hence, the total weightage is 40 (when the maximum weightage=10).

TABLE 2

| Backup Parameter | Predefined Threshold (%) | Actual value of the backup parameter in the system (%) | Weightage Change Value (%) | Weightage | Weighted Value = Actual value * Weightage |
|---|---|---|---|---|---|
| Amount of data changes in the system | 25% | 40.00% | 8.33% | [((40 − 25)/8.33) + 1] = [2.8] = 3 | 0.40 * 3 = 1.2 |
| Scheduled frequency of backup | 10 times in next 30 days or every 3 days backup is scheduled for execution (100 * 10)/30 = 33.3% | 10 times in next 30 days. (100 * 10)/30 = 33.33% | (30 − 3)/(10 − 1) = 3 | [((3 − 3)/3 + 1] = [1] = 1 | (1 − 0.33) * 1(**) = 0.67 |
| Time from last full backup | 12 days (out of 30 days backup window) (100 * 12)/30 = 40% | Last full backup was executed 15 days back. (100 * 15)/30 = 50% | (30 − 12)/(10 − 1) = 2 | [((15 − 12)/2) + 1] = [2.5] = 3 | 0.5 * 3 = 1.5 |
| Available storage space availability | 10% | 20.00% | (100 − 10)/(10 − 1) = 10% | [((20 − 10)/10) + 1] = 2 | 0.20 * 2 = 0.4 |

Backup type value = (1.2 + 0.67 + 1.5 + 0.4)/40 = 3.77/40 = 0.0094
Type of backup: Determination to perform no backup (**) To determine the weighted average value, the actual value obtained for the backup parameter "scheduled frequency of backup" is subtracted by 1 as it is an inverse value. Hence, as the threshold value decreases, more number of backups can be executed.

Hence, the backup type value determined by implementing instructions 230 for the aforementioned example as shown in Table 2 is 0.0094. Fuzzy logic can be applied against the determined backup type value as indicated in Table 1 by implementing instructions 240. The backup type value 0.0094 falls within the first range according to the example of Table 1, i.e. [0-0.15]. Therefore, the type of backup to be executed is the system is none according to the example of Table 1.

Table 3 shows another example according to the present disclosure where four different backup parameters are used to determine the type of backup in a system that allows backup. The four backup parameters used in the present example to determine the type of backup can be: "amount of data changes in the system", "scheduled frequency of backup", "time from last backup" and "available storage space".

Table 3 shows an example predefined threshold for each of the backup parameters, an example actual value of the backup parameter obtained from the system (e.g. a virtual machine), the weightage change value, the weightage, the weighted value, and the backup type value determined for the four backup parameters.

TABLE 3

| Backup Parameter | Predefined Threshold (%) | Actual value of the backup parameter in the system (%) | Weightage Change Value (%) | Weightage | Weighted Value = Actual value * Weightage |
|---|---|---|---|---|---|
| Amount of data changes in the system | 25% | 85.00% | 8.33 | ((85 − 25)/8.33 + 1) = [8.2] = 9 | 0.85 * 9 = 7.65 |
| Scheduled frequency of backup | Once in next 30 days (100 * 1)/30 = 3.33% | 3 times in next 30 days. (100 * 3)/30 = 10.00% | (30 − 3)/(10 − 1) = 3 | (10 − 3)/3 + 1 = [3.33] = 4 | (1 − 0.10) * 4 = 3.6(**) |
| Time from last full backup | 12 days (out of 30 days) (100 * 12)/30 = 40% | Last full backup was executed 25 days back. (100 * 25)/30 = 83.33% | (30 − 12)/(10 − 1) = 2 | (25 − 12)/2 + 1 = [7.5] = 8 | 0.833 * 8 = 6.66 |
| Available storage space | 10% | 80.00% | (100 − 10)/(10 − 1) = 10 | (80 − 10)/10 + 1 = 8 | 0.80 * 8 = 6.4 |

Backup type value = (7.65 + 3.6 + 6.66 + 6.4)/40 = 24.31/40 = 0.607
Type of Backup: Full backup (**) To determine the weighted average value, the actual value obtained for the backup parameter "scheduled frequency of backup" is subtracted by 1 as it is an inverse value. Hence, as the threshold value decreases, more number of backups can be executed.

In the example shown through Table 3, the backup type value determined for the aforementioned example is 0.607. Fuzzy logic can be applied against the backup type value as indicated in Table 1. The backup type value 0.607 falls within the fourth range according to the example of Table 1, i.e. >=0.50. Therefore the type of backup to be executed is the system is full backup according to Table 1. In a consistent manner, the backup type value for any number of backup parameters may be calculated and a backup type determined for execution.

Figure 5:
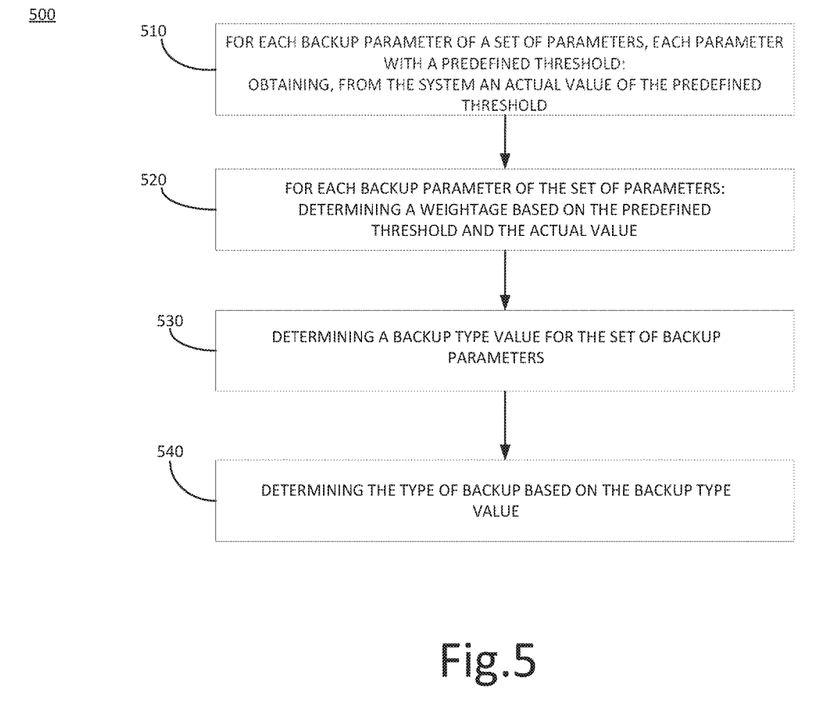
FIG. 5 is a flow diagram depicting an example method for determining the type of backup in the system.

Referring now to FIG. 5, FIG. 5 is a flow diagram depicting an example method 500 for determining the type of backup in a system. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the flow diagram 500 of the method as illustrated (and described in greater detail below) is meant be an example and, as such, should not be viewed as limiting. The described method may be implemented in the form of executable instructions stored on a machine-readable storage medium, such as storage medium 115, and/or in the form of electronic circuitry. The method shown in FIG. 5 can be implemented or performed to determine the type of backup in a system. The system can be associated with a set of backup parameters that may have predefined thresholds for each of the backup parameters from the set.

The flow diagram 500 can start at block 510 that can be executed by instructions 110 described in FIG. 1. At block 510, the actual value of each of the backup parameters from the system can be obtained. These actual values of the backup parameters can be obtained by a user of the system or a computing program associated with the system.

In block 520, a weightage for each backup parameter from the set of backup parameter can be determined. The weightage can be based on the predefined threshold and the actual value of each backup parameter from the set. The weightage can indicate a degree of contribution of the backup parameter for determining the type of backup to be executed in the system. Block 520 can be implemented by performing instructions 120 described in FIG. 1, for example.

In block 530, a backup type value for the whole set of backup parameters can be determined. The backup type value can be defined as an average of the weighted values associated with the set of backup parameters. The backup type value can be based on each of the actual values and the weightages of the set of backup parameters in order to obtain an average value that can be used to determine the type of backup. Block 530 can be implemented by performing instructions 230 described in FIG. 2.

In block 540, the type of backup based on the backup type value can be determined. Block 540 can be performed by applying instructions 240 described in FIG. 2, as one example. In particular, the type of backup can be full backup, differential backup, incremental backup or a determination to perform no backup. The type of backup determined as full backup can be a backup wherein all the blocks of the source application can be considered to be backed up and responsive to the backup type value falling within a first range of values. The full backup can be done for the first time the system is backup, or if the elapsed time from the last full backup is long due in order to have a better RTO. The type of backup determined as differential backup can be a backup of the blocks modified from the last full backup while non-modified blocks from the last full backup are not considered. The differential backup can be determined responsive to the backup type value falling within a second range of values. The type of backup determined as incremental backup can be a backup of the blocks modified from the last full backup or the last differential backup while non-modified blocks from the last full backup or the last differential backup are not considered. The incremental backup can be determined responsive to the backup type value falling within a third range of values. The type of backup determined as a determination to perform no backup can be responsive to the backup type value falling within a four range of values.

Figure 6:
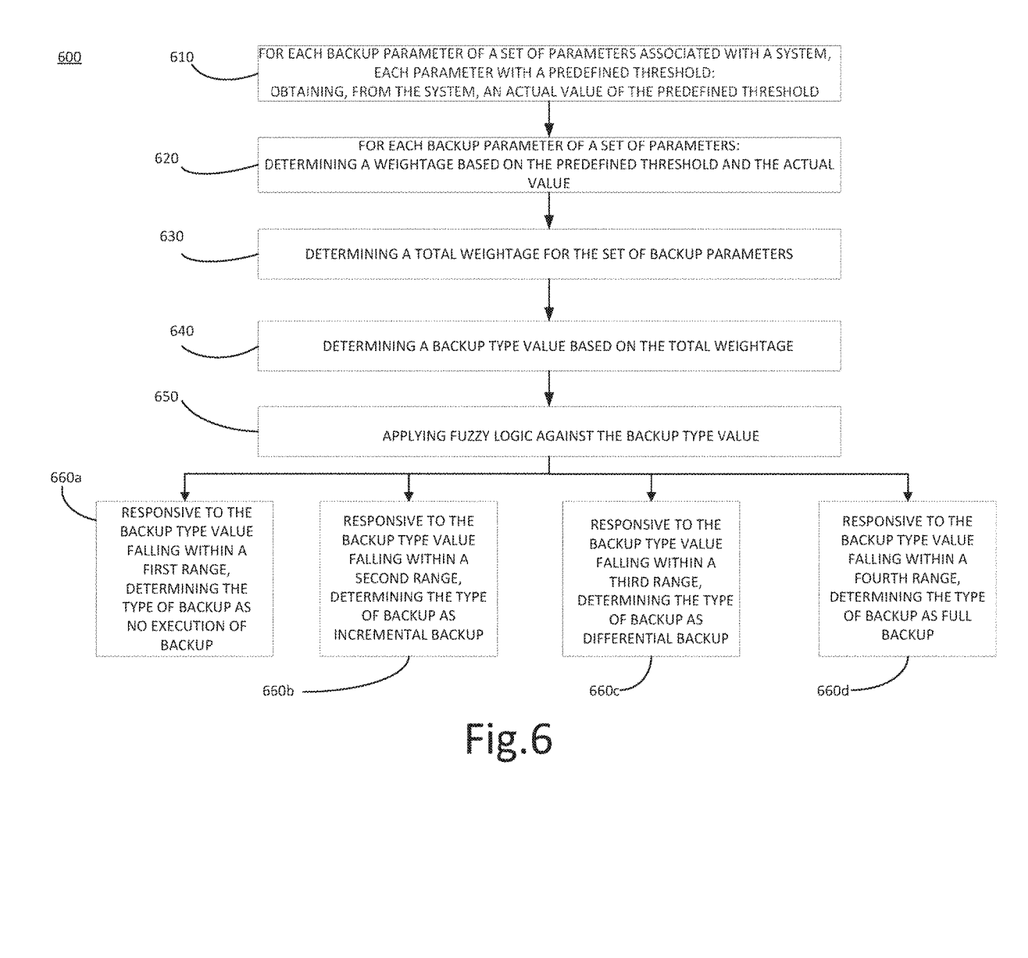
FIG. 6 is a flow diagram depicting an example method for determining the type of backup in the system.

Turning to FIG. 6, FIG. 6 is a flow diagram 600 depicting another example method according to the present disclosure for determining the type of backup in a system. The various processing blocks and/or data flows depicted in FIG. 6 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method as illustrated (and described in greater detail below) is meant be an example and, as such, should not be viewed as limiting. The method shown in FIG. 6 may be implemented in the form of executable instructions stored on a machine-readable storage medium, such as storage medium 115, and/or in the form of electronic circuitry. The method of FIG. 6 can be implemented, performed, or executed to determine the type of backup in a system. The system can be associated with a set of backup parameters that may have predefined thresholds.

The flow diagram 600 can start at block 610 that can be executed by instructions 110 described in FIG. 1. In block 610, the actual values of the backup parameters for each of the backup parameters from the set of backup parameters can be obtained.

In block 620, a weightage for each backup parameter from the set of backup parameters can be determined. The weightage can be based on the predefined threshold and the actual value of each backup parameter from the set. The weightage can indicate a degree of contribution of a particular backup parameter for determining the type of backup to be executed in the system. The weightage can be, e.g., a numeric integer value with default range between [1, 10] (or any other configurable numerical range). The minimum weightage value can be a value of 1 and can be associated with (e.g., mapped to) an interval within the threshold scale (e.g., a subrange of a range of the actual values of the backup parameter) between [0, predefined threshold]. In some examples, the maximum weightage value can be a value of 10 (or any other configurable maximum value) and can be associated with (e.g., mapped to) a maximum threshold value of e.g. 100. The rest of the threshold scale may map weightage values within the range [predefined threshold, 100], which can be equally divided between the remaining values of weightage, [2, 9], Block 620 can be implemented by performing instructions 120 described in FIG. 1, for example.

In block 630, a total weightage for the set of backup parameters can be obtained. The total weightage can be calculated as a sum of the maximum weightage for the whole set of backup parameters. The maximum weightage can be equal to 10. Hence, the total weightage having e.g. four backup parameters can be 40 (when the maximum weightage=10). In another examples, multiplying the actual value of the backup parameter by the weightage for the backup parameter can be defined as the weighted value of the backup parameter.

In block 640, the backup type value can be determined. The backup type value can be based on the total weightage. The backup type value can be defined as an average of the weightages associated with the set of backup parameters. The weightage for the set of backup parameters can be summed up and an averaged based on the total weightage for the set of backup parameters obtained in block 630 in order to obtain the backup type value. Block 640 can be implemented by executing instructions 230 described in FIG. 2.

In block 650, fuzzy logic according to the example of Table 1 can be applied against the backup type value. According to some examples, the fuzzy logic applied to backup type value determined according to the above-mentioned equation can be defined within the range [0, 1]. Block 650 can be implemented by executing instructions 240 described in FIG. 2.

In blocks 660a to 660d, the type of backup can be determined by applying fuzzy logic against the backup type value determined in block 640. Block 660a can determine the type of backup as "a determination to perform no backup", responsive to the backup type value being determined within a first range of values. According to the previous shown example of Table 1, the first range of backup type values can comprise [0-0.15]. Block 660b can determine the type of backup as "incremental backup", responsive to the backup type value being determined within a second range of values. According to Table 1, the second range of backup type values can comprise [0.15, 0.25]. Block 660c can determine the type of backup as "differential backup", responsive to the backup type value being determined within a third range of values. According to the example of Table 1, the third range of backup type values can comprise (0.25, 0.50). Block 660d can determine the type of backup as "full backup", responsive to the backup type value being determined within a fourth range of values. According to the example of Table 1, the fourth range of backup type values can comprise [0.50, 1]. Blocks 660a, 660b, 660c, and 660d can be implemented by executing instructions 310,320,330 and 340 described in FIG. 3.

Figure 7:
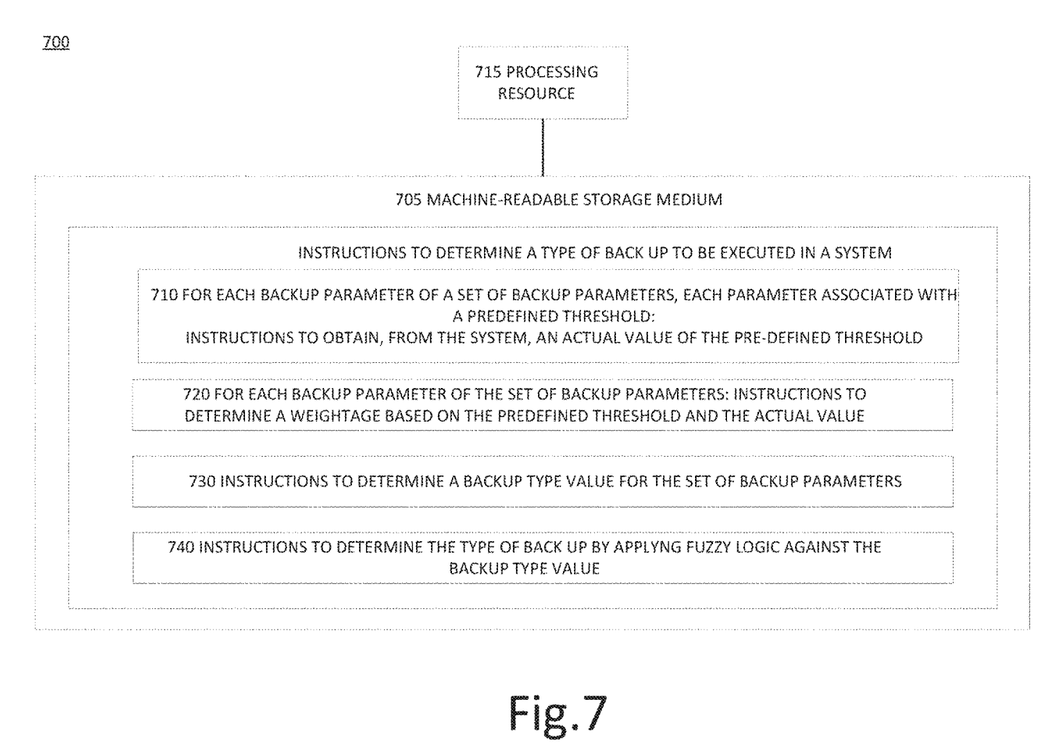
FIG. 7 is a block diagram depicting an example machine-readable storage medium comprising instructions executable by a processor for determining the type of backup in the system.

Turning to FIG. 7, FIG. 7, describes a hardware 700 comprising executable instructions 710 to 750 stored on a machine-readable storage medium 705. The hardware 700 can include a processing resource 715 for executing those instructions. Machine-readable storage medium 705 can be said to store program instructions or code that when executed by processor 715 can implement entities of computing device 100 of FIG. 1.

In FIG. 7, the executable program instructions in machine-readable storage medium 705 comprise instructions to determine a type of backup to be executed in a system. A set of backup parameters associated with the system can be used to determine the type of backup. Each of the backup parameters from the set can have a predefined threshold. The predefined threshold for each of the backup parameters from the set of backup parameters can be determined by a user of the system. The system can be any system that allows any type of backup.

In particular, the machine-readable storage medium 705 can comprise instructions 710 to obtain, from the system, an actual value of the backup parameter for each of the backup parameters from the set. The actual value of the backup parameter for each of the backup parameters can be obtained from the system by e.g. accessing an application for system backup management.

The machine-readable storage medium 705 can comprise instructions 720 to determine a weightage based on the predefined threshold and the actual value of the backup parameter for each of the backup parameters from the set of backup parameters. The weightage for a backup parameter can indicate a degree of contribution of a particular backup parameter for determining the type of backup to be executed in the system.

The machine-readable storage medium 705 can comprise instructions 730 to determine a backup type value for the set of backup parameters. The backup type value can be defined as an average of the weighted values associated with the set of backup parameters.

The machine-readable storage medium 705 can comprise instructions 740 to determine the type of backup by applying fuzzy logic against the backup type value. In particular, the type of backup can be full backup, differential backup, incremental backup or a determination to perform no backup. The type of backup determined as full backup can be a backup wherein all the blocks of the source application can be considered for backup. The full backup can be done for the first time the system is backed up, or if the elapsed time from the last full backup is long due in order to have a better RTO. The type of backup determined as differential backup can be a backup of the blocks modified from the last full backup while non-modified blocks from the last full backup are not considered. The type of backup determined as incremental backup can be a backup of the blocks modified from the last full backup or the last differential backup or the last incremental backup while non-modified blocks from the last full backup or the last differential backup or last incremental backup are not considered.

Figure 8:
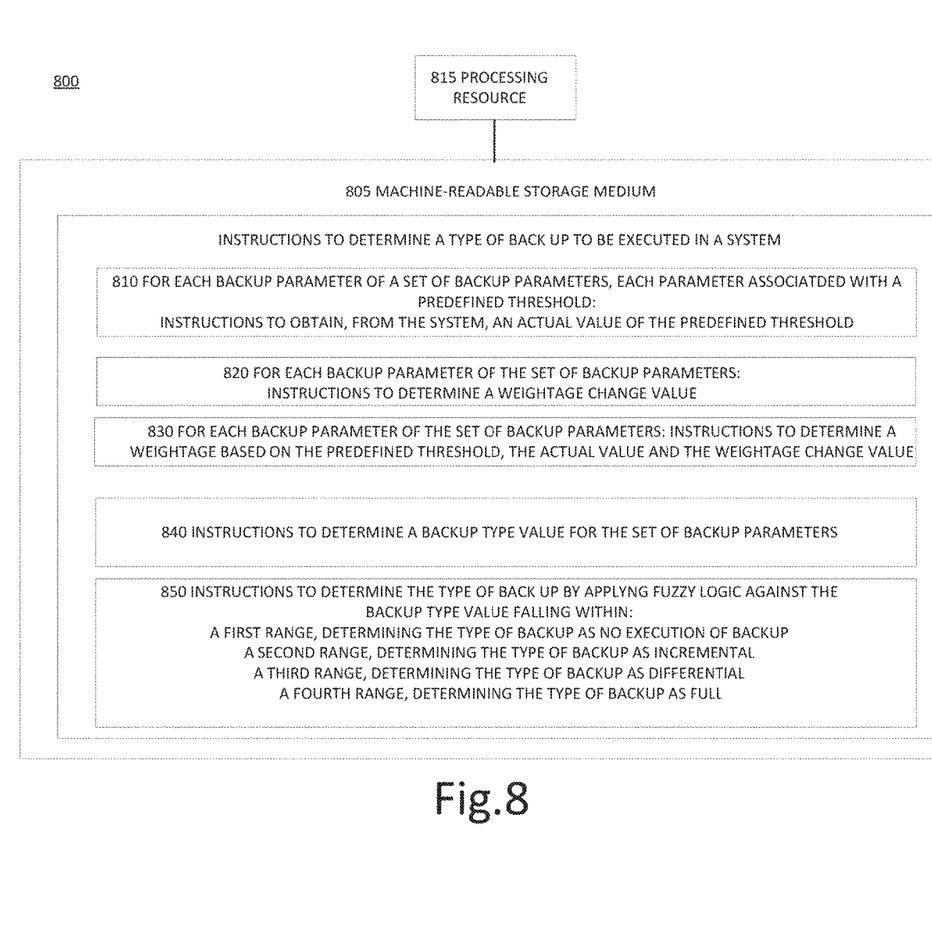
FIG. 8 is a block diagram depicting an example machine-readable storage medium comprising instructions executable by a processor for determining the type of backup in the system.

Referring now to FIG. 8, FIG. 8, describes a hardware 800 comprising executable instructions 810 to 850 stored on a machine-readable storage medium 805. The hardware 800 can include a processing resource 815 for executing those instructions. Machine-readable storage medium 805 can be said to store program instructions or code that when executed by processor 815 can implement entities of computing device 100 of FIG. 1.

In FIG. 8, the executable program instructions in machine-readable storage medium 805 comprise instructions to determine a type of backup to be executed in a system. A set of backup parameters associated with the system can be used to determine the type of backup, where each parameter can have a predefined threshold for the backup parameter. The predefined threshold can be a value of backup parameter that may be defined by a user of the system for the backup. The predefined thresholds can be determined by a user of the system. The system can be any system that allows any type of backup.

In particular, the machine-readable storage medium 805 can comprise instructions 810 to obtain, from the system, an actual value of the backup parameter for each of the backup parameters from the set. The actual value of the backup parameter for each of the backup parameters from the set can be obtained by a user, the systems administrator or a computing program in the system. Moreover, the actual value could be obtained by e.g. a remote computing device with capabilities to access the system to be backed up.

The machine-readable storage medium 805 can comprise instructions 820 to determine a weightage change value. The weightage change value can be a value associated with a variation of the weightage with relation to an increase of the predefined threshold for each of the backup parameters.

The machine-readable storage medium 805 can comprise instructions 830 to determine a weightage based on the weightage change value, the predefined threshold and the actual value of the backup parameter for each of the backup parameters from the set of backup parameters.

The machine-readable storage medium 805 can comprise instructions 840 to determine a backup type value for the set of backup parameters. The backup type value can be defined as an average of the weighted values associated with the set of backup parameters determined in instructions 830. The backup type value can be based on each of the actual values and the weightages of the backup parameters from the set of backup parameters. The backup type value can be used to determine the type of backup.

The machine-readable storage medium 805 can comprise instructions 850 to determine the type of backup by applying fuzzy logics against the backup type value determined in instructions 840. According to the present solution, the fuzzy logic applied against the backup type value can be defined within the range [0, 1]. In particular, the machine-readable storage medium 805 can comprise instructions 850 to determine the type of backup as "a determination to perform no backup", responsive to the backup type value falling within a first range. According to the example of Table 1, the first range of backup type values can fall within [0-0.15]. The machine-readable storage medium 805 can comprise instructions 320 to determine the type of backup as "incremental backup", responsive to the backup type value falling within a second range. According to the example of Table 1, the second range of backup type values can fall within (0.15, 0.25]. The machine-readable storage medium 805 can comprise instructions 850 to determine the type of backup as "differential backup", responsive to the backup type value falling within a third range. According to the example of Table 1, the third range of backup type values can fall within (0.25, 0.50). The machine-readable storage medium 805 can comprise instructions 850 to determine the type of backup as "full backup", responsive to the backup type value falling within a fourth range. According to the example of Table 1, the fourth range of backup type values can fall within [0.50, 1].

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 1-8 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A system comprising:
   a physical processor; and
   a non-transitory storage medium storing machine readable instructions executable on the physical processor to:

for each respective backup parameter of a set of backup parameters comprising backup parameters selected from among a parameter relating to an amount of storage space of a storage system, a parameter relating to a type of data to be backed up, and a parameter relating to an available resource of the system, the respective backup parameter having a respective predefined threshold for the respective backup parameter:

obtain a respective actual value of the respective backup parameter; and determine a respective weightage for the respective backup parameter based on the respective predefined threshold and the respective actual value of the respective backup parameter, the respective weightage indicating a degree of contribution of the respective backup parameter for determining a type of backup to be executed in the system;

select the type of backup from a plurality of different types of backup based on the respective weightage and the respective actual value of each respective backup parameter of the set of backup parameters, wherein the machine-readable instructions are executable on the physical processor to select the type of backup by:

determining a respective weightage change value for each respective backup parameter of the set of backup parameters based on a respective maximum weightage, a respective minimum weightage, a respective predefined threshold, and a respective maximum value of the respective predefined threshold, wherein the respective weightage change value is a value associated with a variation of the respective weightage with relation to an increase of the respective predefined threshold for the respective backup parameter; and perform the selected type of backup to backup data from a source to the storage system.

2. The system of claim 1, wherein the machine-readable instructions are executable on the physical processor to determine the respective weightage by:

identifying a minimum weightage and a maximum weightage, wherein the minimum weightage indicates a weightage value associated with a first range comprising the predefined threshold, wherein the first range comprises values between zero and the predefined threshold; and wherein the maximum weightage indicates a weightage value associated with a maximum value of the predefined threshold.

3. The system of claim 1, wherein the machine-readable instructions are executable on the physical processor to select the type of backup further by:

determining the respective weightage for each respective backup parameter of the set of backup parameters based on the respective weightage change value.

4. The system of claim 1, wherein the machine-readable instructions are executable on the physical processor to select the type of backup by:

determining a backup type value for the set of backup parameters, wherein the backup type value is an average of the weightages associated with the set of backup parameters.

5. The system of claim 4, wherein the selecting of the type of backup is based on the backup type value.

6. The system of claim 5, wherein the machine-readable instructions are executable on the physical processor to select the type of backup by applying fuzzy logic against the backup type value.

7. The system of claim 4, wherein the machine readable instructions are executable on the physical processor to:

responsive to the backup type value falling within a first range, select the type of backup as an incremental backup;

responsive to the backup type value falling within a second range, select the type of backup as a differential backup; and responsive to the backup type value falling within a third range, select the type of backup as a full backup.

8. The system of claim 1, wherein the set of backup parameters further comprise at least one of:

a percentage of data change in the system from a last backup;

a frequency of scheduled backups in the system; and a time that has passed since a last backup of the system.

9. A method executed by a system comprising a physical processor:

for each respective backup parameter of a set of backup parameters comprising backup parameters selected from among a parameter relating to an amount of storage space of a storage system, a parameter relating to a type of data to be backed up, and a parameter relating to an available resource of the system, the respective backup parameter having a respective predefined threshold for the respective backup parameter:

obtaining a respective actual value of the respective backup parameter; and determining a respective weightage based on the respective predefined threshold and the respective actual value, the respective weightage indicating a degree of contribution of the respective backup parameter for determining a type of backup to be executed in the system;

determining a backup type value for the set of backup parameters, wherein the backup type value is an average of the weightages associated with the set of backup parameters;

selecting the type of backup based on applying fuzzy logic against the backup type value; and cause performance of the selected type of backup to backup data from a source to the storage system.

10. The method of claim 9, wherein determining the respective weightage comprises determining a respective minimum weightage and a respective maximum weightage for the respective backup parameter, the method further comprising:

determining a total weightage for the set of backup parameters, the total weightage calculated as a sum of the respective maximum weightage of each respective backup parameter of the set of parameters.

11. The method of claim 10, further comprising determining the backup type value based on the total weightage.

12. The method of claim 9, further comprising:

responsive to the backup type value falling within a first range, selecting the type of backup as incremental backup;

responsive to the backup type value falling within a second range, selecting the type of backup as differential backup; and responsive to the backup type value falling within a third range, selecting the type of backup as full backup.

13. The method of claim 9, wherein the set of backup parameters further comprise:
- a number of times a backup was executed in the system during a specified time period.

14. A non-transitory machine-readable storage medium comprising machine-readable instructions executable by a physical processor of a computing device for determining a type of backup to be executed in a system, the machine-readable storage medium comprising instructions to:
- for each backup parameter of a set of backup parameters, each backup parameter having a predefined threshold for the backup parameter:
  - obtain, from the system, an actual value of the backup parameter; and
  - determine a weightage based on the predefined threshold and the actual value, the weightage indicating a degree of the contribution of the backup parameter for determining the type of backup to be executed in the system;
- determine a backup type value for the set of backup parameters, wherein the backup type value is an average of the weightages associated with the set of backup parameters;
- determine the type of backup by applying fuzzy logic against the backup type value; and
- cause performance of the determined type of backup to backup data from a source to the storage system.

15. The non-transitory machine-readable storage medium of claim 14, comprising instructions to determine the weightage of the backup parameter through determination of a maximum weightage and a minimum weightage, wherein;
- the minimum weightage indicates a weightage value associated with a first range comprising the predefined threshold, wherein the first range comprises values between zero and the predefined threshold; and
- the maximum weightage indicates a weightage value associated with a maximum value of the predefined threshold.

16. The non-transitory machine-readable storage medium of claim 15, further comprising instructions to:
- determine a weightage change value for each backup parameter from the set,
- wherein the weightage change value is based on the maximum weightage, the minimum weightage, the predefined threshold, and the maximum value of the predefined threshold,
- wherein the weightage change value is a value associated with a variation of the weightage with relation to an increase of the predefined threshold for each of the backup parameters; and
- determine the weightage based on the weightage change value.

17. The non-transitory machine-readable storage medium of claim 14, further comprising instructions to:
- responsive to the backup type value falling within a first range, determine the type of backup as an incremental backup;
- responsive to the backup type value falling within a second range, determine the type of backup as a differential backup; and
- responsive to the backup type value falling within a third range, determine the type of backup as a full backup,
- wherein the first, second, and third ranges are determined based on the fuzzy logic, wherein the backup type value is determined responsive to the calculation of a total weightage for the set of backup parameters, the total weightage calculated as a sum of the maximum weightage of each backup parameter of the set of parameters.

18. The non-transitory machine-readable storage medium of claim 14, wherein the set of backup parameters comprise at least one of:
- a percentage of data change in the system from a last backup;
- a frequency of scheduled backups in the system;
- a percentage of available storage space in the system;
- a time that has passed since a last backup;
- a type of data to be backed up in the system;
- available resources in the system; and
- a number of times a backup was executed in the system during a specified time period.

* * * * *